Oct. 22, 1968     K. A. B. JARREBY     3,406,748
METHOD FOR THE MANUFACTURE OF COOLING ROLLERS AND
SIMILAR ARTICLES FOR BAND-SHAPED MATERIAL AND
ROLLERS, MANUFACTURED ACCORDING TO THE METHOD

Filed May 17, 1965     4 Sheets-Sheet 1

Karl Axel Bertil Jarreby,
INVENTOR

BY W. enderath,
    Lindand Ponack, ATTORNEYS

Oct. 22, 1968 K. A. B. JARREBY 3,406,748
METHOD FOR THE MANUFACTURE OF COOLING ROLLERS AND
SIMILAR ARTICLES FOR BAND-SHAPED MATERIAL AND
ROLLERS, MANUFACTURED ACCORDING TO THE METHOD
Filed May 17, 1965 4 Sheets-Sheet 4

United States Patent Office 3,406,748
Patented Oct. 22, 1968

3,406,748
METHOD FOR THE MANUFACTURE OF COOLING ROLLERS AND SIMILAR ARTICLES FOR BAND-SHAPED MATERIAL AND ROLLERS, MANUFACTURED ACCORDING TO THE METHOD
Karl Axel Bertil Jarreby, Falkenberg, Sweden, assignor to Skandinaviska Apparatindustri AB, Hamnvagen, Sweden, a corporation of Sweden
Filed May 17, 1965, Ser. No. 456,316
Claims priority, application Sweden, May 21, 1964, 6,158/64
6 Claims. (Cl. 165—89)

ABSTRACT OF THE DISCLOSURE

A heating or cooling roller wherein an outer mantle is spaced from an inner mantle so as to form a chamber with an inlet and an outlet for a cooling or heating medium. The outer mantle is connected to the inner mantle by elastic packings and means are provided for compressing such elastic material so that the outer mantle may be displaced relative to the inner mantle by applying different pressures to the compression of such packings. In this way the relative position of the outer mantle may be changed relative to the inner mantle.

---

Figure 1:
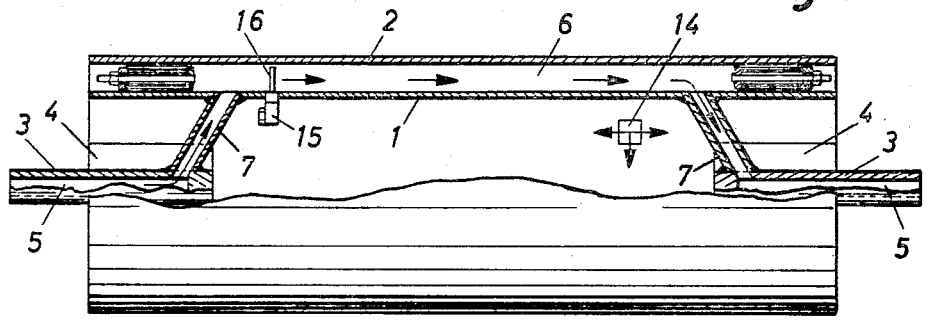

In cellulose, paper and textile refining industries and similar branches of production of the industry webs of paper, textile products and similar articles are moved over cooling rollers so as to humidify the web. As an example may be mentioned condition of paper for being printed. Such rollers are provided with a cylindrical chamber having inlets and outlets for the cooling medium, said chamber being limited in direction outwards by an outer mantle and in direction inwards by an inner mantle. These rollers have previously been manufactured by means of casting and the shaft trunnions at both ends of the roller as well as the outer mantle of the roller had to be worked by means of cutting tools. Such a work is rather lengthy and expensive and great difficulties had to be overcome so as to obtain the required counterbalancing of the roller which rotates with its shaft trunnions in bearings.

According to another known method the roller is manufactured by means of a welding at the ends of an inner mantle, the latter provided with coaxial carrying trunnions, to an outer mantle so that there is formed passages between these two mantles for the cooling medium. Also in this case there is required a turning of the outer mantle.

This invention has reference to a new and simplified method for the manufacture of such cooling rollers. The main feature of the invention is to be seen therein that between the inner mantle and the outer mantle there are arranged packings of an elastic and preferably isotrop material and that by these packings the outer mantle by means of forces of different strength and acting radially outwards is forced to be displaced and/or to change shape in relation to the inner mantle. This method renders it possible to manufacture the inner and outer mantles of sheet metal which in machines are rolled to cylinders and each cylinder is welded along the longitudinal joint. By means of a compression of packings arranged between the outer and the inner mantles at the ends of the roller, the outer mantle is clamped to the inner mantle in such a way that a chamber is formed between these two mantles so as to allow a streaming through the roller of the cooling medium. The latter passes through the hollow shaft trunnions of the roller, these trunnions communicating with the chamber through tubes serving as spokes. By means of a compression of varying strength at different places of the same it is possible to move the outer mantle radially in relation to the inner mantle and thereby to obtain a very exact centering. Between the spokes of the roller it is possible to insert balancing weights to be arranged on the inside of the inner mantle. When needed, the outer mantle can be dismounted and the chamber be cleaned and its walls be treated for rust-preventing.

The invention has reference also to a cooling roller manufactured according to the method.

According to a preferred embodiment of the invention the cooling roller is characterised thereby that between the inner mantle of the roller, having coaxial trunnions at the ends, and the outer mantle of the roller there are at least at the ends of the roller inserted packings of an elastic, preferably isotrop material and that the roller is provided with means for compressing the packings to change the form of the outer mantle and/or to displace the latter in relation to the inner mantle.

In certain industries it happens that such rollers have to be exposed, by means of a counter roller, to a rather strong radial pressure. In such cases it is not advisable to use an isotrop, elastic material as such a material normally cannot resist said radial pressure of the counter roller. The width of the slot in the press nip will then vary in accordance to the load which as a rule cannot be permitted.

The purpose of the present invention is also to overcome this last mentioned drawback and to take advantage of the reduced turning work. This is, according to a modification of the invention, obtained thereby that in the annular space between the two mantles there is at each end of the rollers arranged two circlips, slotted in the transverse direction and comprising steel or a similar material, one of said circlips having an outer diameter only a little smaller than the inner diameter of the outer mantle and the other circlip having an inner diameter only a little larger than the outer diameter of the inner mantle whereas the two other surfaces of the circlips turned radially towards each other in arranged position being conical in such a way that the circlips at the axially inner end are thicker than at the outer end, and thereby that in an annular space between said circlips the device comprises an annular take up means having radially inner and outer surfaces converging towards its axially inner end with a conicity which corresponds to the corresponding conical surfaces of the circlips, said take up means adapted, by means of an axial displacement into the space between the circlips, to press said circlips, the outer one against the outer mantle of the roller and the inner one against the inner mantle of the roller.

Figure 2:
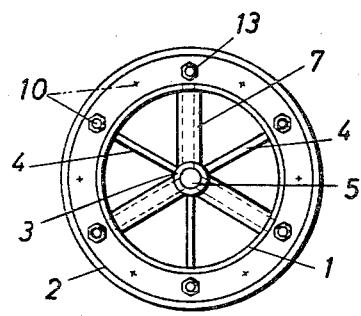
Figure 3:
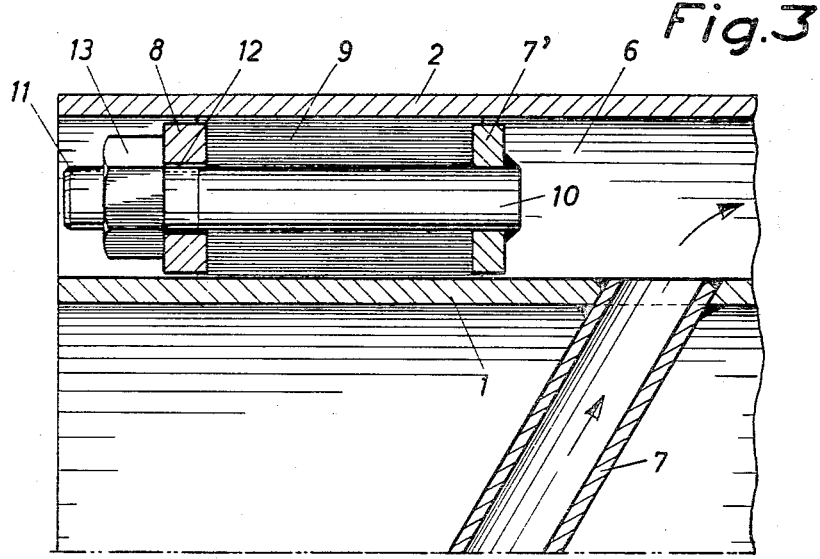
Figure 4:
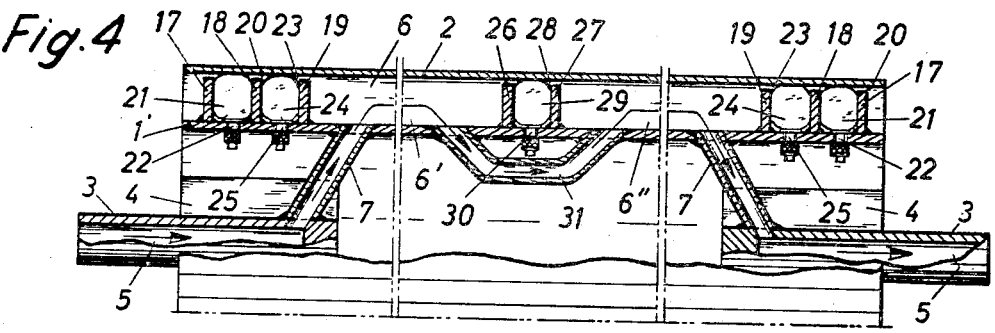
Figure 5:
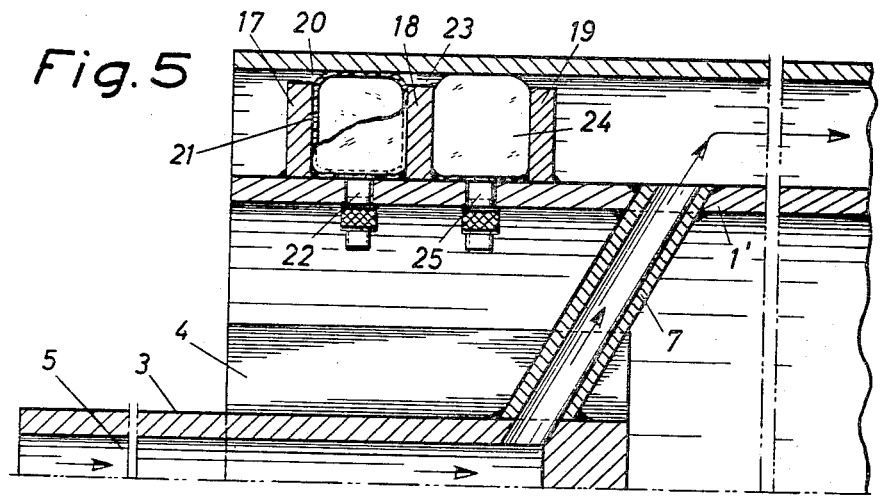
Figure 6:
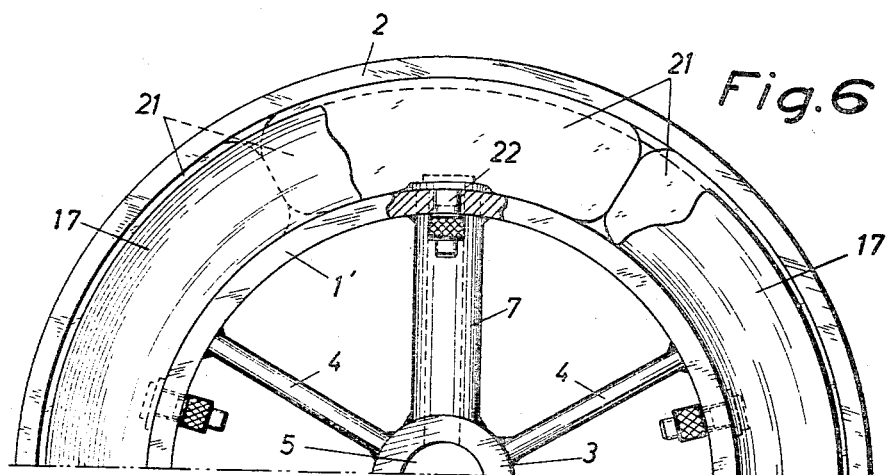
Figure 7:
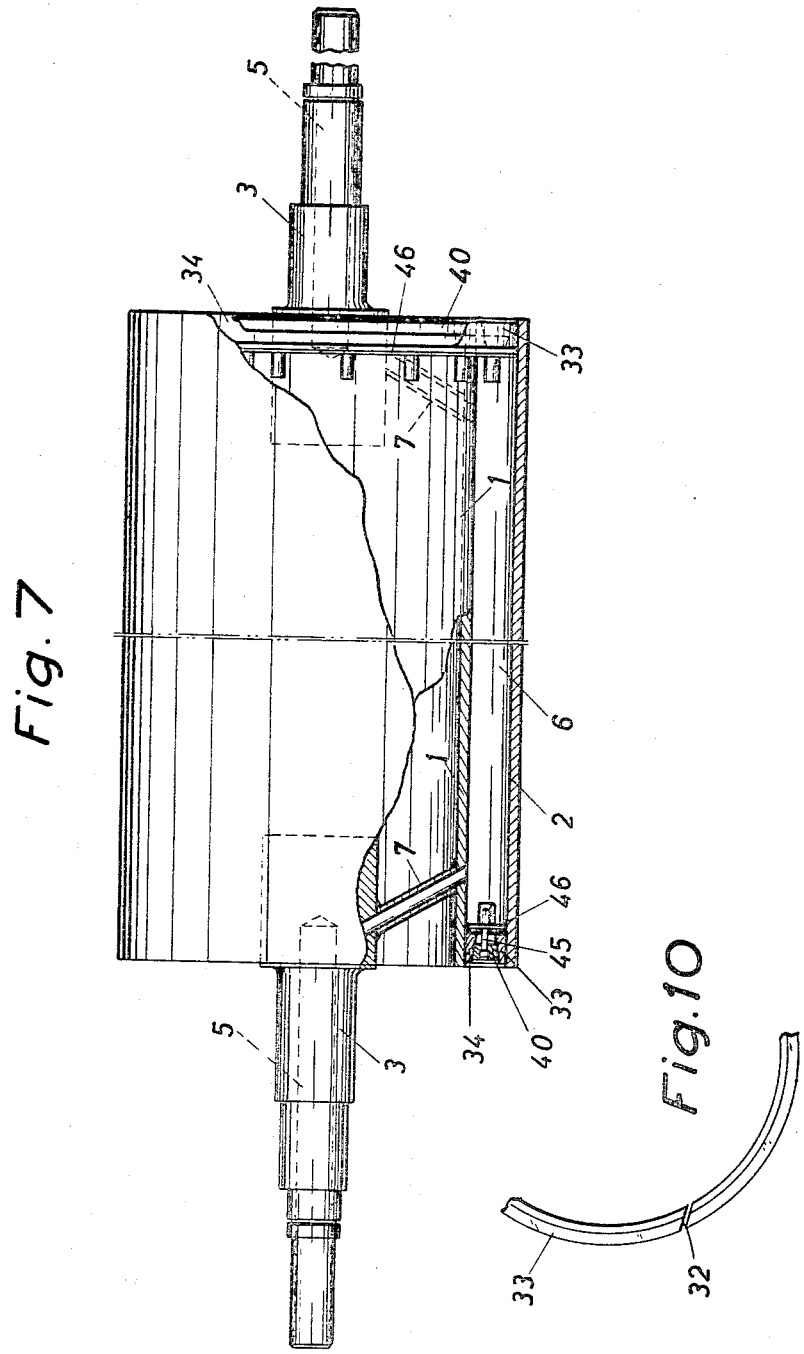
Figure 8:
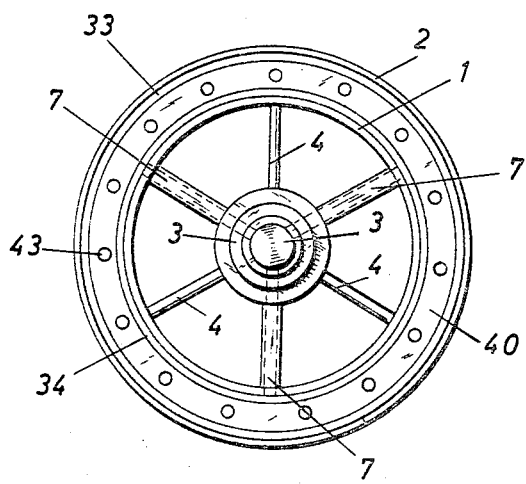
Figure 9:
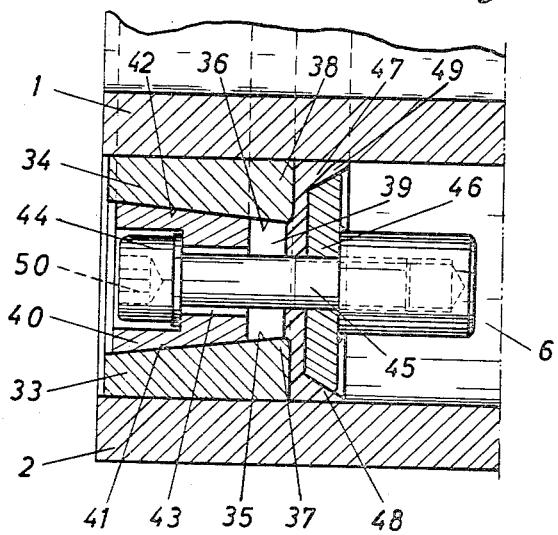

The invention will now be described with reference to the attached drawings showing two embodiments of a cooling roller according to the invention. In the drawings:

FIG. 1 is a partly cut side elevation of a cooling roller according to the invention, FIG. 2 is an end elevation of the same, FIG. 3 shows on an enlarged scale a longitudinal section through the left hand portion of the cooling roller according to FIG. 1, FIG. 4 shows a broken longitudinal section through a cooling roller according to another embodiment, FIG. 5 shows on an enlarged scale a longitudinal section through the upper left hand portion of the cooling roller, FIG. 6 is an elevation of the cooling roller according to FIG. 5, FIG. 7 is a side elevation, shown in partial longitudinal section, of a roller according to a modification of the invention, FIG. 8 is an end elevation of the roller, FIG. 9 shows on an enlarged scale a section through the end of the roller which according to FIG. 7 is the lower left hand portion of the roller, and FIG. 10 is an end elevation of a part of the outer circlip comprised in the device.

The inner mantle 1 and the outer mantle 2 of the cooling roller are manufactured from rather thin sheet (with a thickness of e.g. 4–6 millimetres) which has been rolled to cylinder shape with a welded longitudinal joint. The joint is ground after the welding in such a way that the mantles externally will be smooth. Alternatively, the mantles may after the welding be submitted to a further rolling operation so that they will be practically completely cylindrical. Preferably by means of welding there are attached to the inner mantle the shaft trunnions 3— which are hollow—by means of spokes 4 in such a way that the inside of the outer mantle 1 can be reached between said spokes 4. The interiors 5 of said shaft trunnions 3 are in communication with the space 6 between the mantles 1 and 2 through pipes 7 which also serve a spokes.

In the space 6 there are, at the ends of the rollers, inserted two rings 7', 8 situated at some distance from each other and between these rings 7' and 8 there is arranged a ring 9 of rubber or a similar elastic and isotrop material. Through the ring 9 pass at different places bolts 10 which with one end are attached to the inner ring 7' and with their outer, threaded ends 11 freely pass through ports 12 in the outer ring 8. At the outer end of each one of the bolts 10 there is screwed a nut 13. The rings 7', 8, and 9 are inserted in the space 6 between the mantles 1 and 2 from the ends of the roller and arranged in such a way that the packings be situated axially outside the connection ends of the pipes 7 at the inner mantle 1. By means of a tightening of the nuts 13 the rings 7' and 8 in each ring pair are displaced in the direction towards each other while compressing the elastic ring 9. This ring 9 is thereby pressed tight against the mantles 1 and 2. The space 6 between the mantles 1 and 2 will thus form a passage chamber for the medium streaming as indicated by means of the arrows in FIG. 1 through the shaft trunnions 3 and the pipes 7. This medium may comprise cooling water. According to the shown embodiment each ring 7' is provided with six bolts 10.

Due to this arrangement it is possible by a varying tightening of the nuts 13 to obtain a compression of the elastic ring 9 of a different strength at the different bolts 10. It is thereby rendered possible to displace radially the outer mantle 2 in relation to the inner mantle 1 so as to obtain an exact centering of the outer mantle in relation to the shaft trunnions 3. It is possible by a different tightening of the nuts 13 to some extent to change the shape of the outer mantle 2 and to correct the same in such a way that it is given an exact cylindric form at least at the ends. There is not required any turning of the outer mantle 2.

Due to the fact that by means of the chosen construction with spokes 4 between the shaft trunnions 3 and the inner mantle 1 the interior of the roller is available between the spokes 4 and this makes it possible to arrange exactly and correctly on the inside of the inner mantle 1 any needed balance weights 14 in such a way that it is possible not only to perform a static but also a dynamic balancing of the roller.

So as to make it possible to fill the chamber 6 completely with cooling medium, the air must be expelled from the same. To this end there is in the inner mantle 1 arranged an air exhaust valve 15 which by means of a tube 16 debouches in the interior of the passage chamber 6 close to the outer mantle 2.

According to the embodiment shown in FIGS. 4–6 the inner mantle 1' is at each end provided with three fixed annular flanges 17, 18, and 19 situated at some distance from each other. In the space between the flanges 17 and 18 there is inserted a series of successive hoses 21 shaped as sausages and each provided with a nipple extending through the inner mantle 1' and provided with an inflation mouth piece and a non-return valve (not shown) preventing pressed in air to escape from the hose.

By an inflating of the hoses by means of compressed air the hoses are pressed against the outer mantle 2, the harder the higher the air pressure is in the hoses. It is thus rendered possible to change, by compressing the air in the hoses 21 differently, the radial position of the outer mantle 2 in relation to the shaft trunnions 3 and thus to obtain an exact centering of the outer mantle.

So as to give the chamber required tightness at the ends there is in each space 23 between the flanges 18 and 19 inserted a hose 24 extending around it. Also these two hoses 24 are provided with each their nipple 25 with a non-return valve (not shown) and extending through the inner mantle 1'. At the inflating, these two hoses 24 are pressed hard against the mantles 1' and 2 which gives a good tightening.

In connection with extremely long rollers it may, as shown in FIG. 4, be advisable, at least at the centre of the roller, to arrange two further annular flanges 26, 27 and in the space 28 between the same to arrange a series of hoses 29 shaped as sausages and each provided with a nipple 30 extending through the inner mantle 1', and nipple having a non-return valve (not shown). Such a device makes it possible to correct, at need, the shape of the outer mantle 2 so that the same will be exactly cylindrical also at its centre portion. As this series of hoses 29 and also the flanges 26, 27 divide the chamber 6, one or several by-pass conduits 31 should be arranged on the inside of the inner mantle 1' so as to feed cooling medium from one half 6' of the chamber to the other half 6" of the same.

At very long rollers it is of course possible to arrange more than one row of hoses 29 with associated flanges 26, 27 on the inner mantle 1'.

Also in the embodiment shown in FIGS. 4–6 the roller is provided with spokes 4 comprising edgewise arranged and welded sheet pieces. However, these sheets can be dispensed with if the pipes 7 are reinforced by means of such edgewise arranged sheets.

It is obvious that the assembling of the cooling roller is easily carried out and there is, as a rule, not required any post-treatment such as turning or grinding of the mantle 2. One becomes further independent of certain storage dimension of tubes, e.g. drawn tubes, as the mantles can be rolled of flat sheets which are welded. It is also obvious that the roller, due to its construction, is easily dismounted which gives a possibility of de-rusting and renewed rust preventing treatments.

According to the embodiment shown in FIGS. 7–10 in the space 6 at the ends of the roller two circlips 33, 34 are inserted, provided with a transverse slot 32 and having different diameters. The circlips 33 and 34 can be manufactured from steel or a similar material. As obvious from FIG. 10 the slot 32 extends preferably obliquely through each circlip. The greater circlip 33 has an outer diameter a little smaller than the inner diameter of the outer mantle 2. The smaller circlip 33 has an inner diameter a little larger than the outer diameter of the inner mantle 1. The radial surfaces 35 and 36, respectively, of the circlips 33 and 34 turned towards each other are conical in such a way that the axially inner ends 37 and 38, respectively, of the circlips are thicker than their outer ends. In the space 39 between the circlips 33, 34 there is inserted a take up ring 40 the radially outer and inner surfaces 41 and 42, respectively, of which are conical with a conicity that corresponds to the conicity of the surfaces 35, 36 of the circlips 33 and 34. The take up ring 40 is provided with a number of bores 43 the axes of which are parallel to the longitudinal axis of the roller. Through these bores 43 are passed with a great play bolts 45 having heads 44 and being apt to be screwed into a nut ring 46. Between the nut ring 46 and the circlips 33 and 34 there is arranged an annular tightening 47 of rubber or another suitable, elastic material. The tightening is provided with peripherily embracing lips 48 and 49 adapted, by means of a positive pressure in the space 6, to be pressed to tightening abutment against the mantles 1 and 2.

Upon the entering of the circlips 33 and 34, the take up ring 40, the nut ring 46 with the interposed tightening ring 47, and the bolts 45 as a unit have been entered into the space 6 between the mantles 1 and 2, the surfaces of which turned towards each other do not have to be turned, the bolts 45 are tightened. Hereby, to begin with the circlips 33 and 34 are displaced due to the friction between the take up ring 40 and the circlips 33, 34 axially in the direction towards the nut ring 46 whereas the tightening ring is somewhat compressed and there is obtained the required tightening between the nut ring and the circlips. At a continued tightening of the bolts 45 and a therefrom resulting axial displacement of the take up ring 40 in the direction towards the nut ring 46, the circlips 33 and 34 are expanded or compressed, respectively, in such a way that they are brought to abutment against the outer mantle 2 or the inner mantle 1, respectively. The connection between the outer mantle and the inner mantle will hereby be very good and the outer mantle can then be exposed to considerable radial pressures without springing. A similar unit is arranged also at the opposite end of the roller.

At very long rollers exposed to considerable radial pressures it might be necessary to arrange such a unit as shown in FIG. 9 approximately at the central portion of the roller. This unit does, however, not have to be provided with any tightening, sealing ring 47. In this intermediate unit it is for the tightening of the bolts 45 of course required a long key fitting the inner hexagonal recess 50 in the screw head 44.

The shown and described embodiments are to be regarded only as examples and the different details of the cooling roller may be constructively modified in many ways within the scope of the appended claims. The roller can be constructed for other cooling media than water and it could be used also as a heating roller (drying roller) adapted to be passed through by a heating medium, e.g. steam. The ring 8 does not have to be manufactured in one single piece but can comprise a number of ring pieces arranged successively in an annular row, each of them passed through by a bolt 10 provided with a nut 13. Even though it is preferred to manufacture the take up ring 40 and the nut ring 46 as whole rings this is not absolutely necessary. They could comprise ring segments. The sealing ring 47 can have another shape than the one shown on the drawings. The rollers may be used for cooling or heating webs, e.g. of textile or cellulose matter.

What I claim is:
1. A heat transfer roll comprising an outer mantle, an inner mantle concentric with said outer mantle and spaced therefrom to define an annular chamber throughout the length thereof, hollow shaft trunnions, radial hollow spokes connected to said trunnions and said inner mantle, inlet and outlet means on said trunnions, a fluid communication with said spokes and the chamber defined by said mantle, continuous packing means provided between said inner and outer mantle in the space defining the ends of the chamber, said means extending throughout the peripheral extent of the chamber so as to close the ends thereof, said packing means comprising ring means, bolt means connecting said ring means together in relation to one another and to permit adjustment of the eccentricity of said mantles one to the other by the application of pressures of varying amounts so as to prevent displacement of said inner and outer mantles.

2. A heat transfer roll according to claim 1 wherein said packing means closing the ends of the chamber comprises an elastic ring adapted to be displaced radially by said bolt means to provide a precise space relationship with said inner and outer mantle.

3. A heat transfer roll according to claim 1 wherein said packing means comprises two transversely slotted circlips arranged, at each end of said roll, in the annular space formed between said inner mantle and said outer mantle, one of said circlips having an outer diameter only a little smaller than the inner diameter of said outer mantle and the other one of said circlips having an inner diameter only a little larger than the outer diameter of said inner mantle, the two other surfaces of said circlips turned radially towards each other in assembled position being conical so that the circlips at the axially inner ends are thicker than at their outer ends, an annular take up means inserted in an annular space between said circlips, said take up means having outer and inner axially inwardly converging surfaces of a conicity corresponding to the conicity of the corresponding conical surfaces of said circlips, said take up means adapted by being axially displaced into the space between said circlips to press said circlips the outer one against said outer mantle and the inner one against said inner mantle.

4. A heat transfer roll according to claim 3 wherein said packing means comprises said annular take up means being passed through by said bolts, said bolts being parallel to the longitudinal axis of said roller, said bolts with their heads further being situated at the axially outer end of said take up means and adapted to be screwed into a nut ring arranged axially inside said circlips.

5. A heat transfer roll according to claim 3 wherein said packing means comprises a sealing arranged axially inside said circlips and adapted to be clamped between said nut ring and said circlips.

6. A heat transfer roll according to claim 1 wherein said packings comprise inflatable hoses.

References Cited

UNITED STATES PATENTS

| 2,107,315 | 2/1938 | Wainwright | 138—89 |
| 2,993,616 | 7/1961 | Carlile et al. | 138—89 X |
| 2,915,293 | 12/1959 | Justus et al. | 165—89 X |
| 3,051,200 | 8/1962 | Bevington | 138—89 |
| 3,129,755 | 4/1964 | Gould et al. | 165—89 |

FOREIGN PATENTS

| 1,132,323 | 6/1962 | Germany. |

ROBERT A. O'LEARY, *Primary Examiner.*

T. W. STREULE, *Assistant Examiner.*